United States Patent [19]
Barkley et al.

[11] Patent Number: 5,815,340
[45] Date of Patent: Sep. 29, 1998

[54] APPARATUS AND METHODS FOR CARTRIDGE RETRIEVAL AND INSERTION IN A STORAGE LIBRARY SUBSYSTEM INCLUDING A ROBOTIC SHUTTLE HAVING A SOLE ROCKER BEAM

[75] Inventors: John A. Barkley, Longmont; Stephen Ward Graeber, Louisville; Robert John Schaefer, Boulder, all of Colo.

[73] Assignee: Breece Hill Technologies, Inc., Boulder, Colo.

[21] Appl. No.: 755,791

[22] Filed: Nov. 25, 1996

[51] Int. Cl.⁶ .................................................. G11B 15/68
[52] U.S. Cl. ........................ 360/92; 360/98.06; 369/36
[58] Field of Search ...................... 360/92, 98.04–98.06; 369/34–36

[56] References Cited

U.S. PATENT DOCUMENTS

| | | | |
|---|---|---|---|
| 5,206,814 | 4/1993 | Cahlander et al. | 360/92 |
| 5,274,516 | 12/1993 | Kakuta et al. | 360/92 |
| 5,353,179 | 10/1994 | Elliott et al. | 360/92 |
| 5,371,640 | 12/1994 | Kvifte et al. | 360/92 |
| 5,460,476 | 10/1995 | Gazza | 360/98.06 |
| 5,502,697 | 3/1996 | Taki | 369/34 |
| 5,532,931 | 7/1996 | Erickson, Jr. et al. | 360/92 |
| 5,537,268 | 7/1996 | Felde et al. | 360/92 |
| 5,673,155 | 9/1997 | Motoyama et al. | 360/92 |

*Primary Examiner*—Jefferson Evans
*Attorney, Agent, or Firm*—Lee, Fishman & Isaac; Daniel N. Fishman; John L. Isaac

[57] ABSTRACT

A storage library subsystem comprising a frame, a robotic shuttle attached to and linearly movable relative to the frame, a media read/write device attached to the frame, and a storage media cartridge magazine attached to the frame. The robotic shuttle is provided with a plurality of ports for receipt and ejection of storage media cartridges. The media read/write device is disposed opposite a first port of the robotic shuttle at a first point of the linear movement of the robotic shuttle so that a storage media cartridge may be passed between the device and the robotic shuttle at the first point of linear movement. The magazine has at least one slot for storage of a storage media cartridge, the slot being disposed opposite a second port of the robotic shuttle at a second point of the linear movement of the robotic shuttle so that a storage media cartridge may be passed between the slot and the robotic shuttle at the second point of linear movement.

18 Claims, 14 Drawing Sheets

APPARATUS AND METHODS FOR CARTRIDGE RETRIEVAL AND INSERTION IN A STORAGE LIBRARY SUBSYSTEM INCLUDING A ROBOTIC SHUTTLE HAVING A SOLE ROCKER BEAM

FIELD OF THE INVENTION

The present invention relates to storage library subsystems as commonly used in the computer data storage arts. More specifically, the present invention relates to apparatus and associated methods for the robotic retrieval and insertion of storage media cartridges in a storage library subsystem.

PROBLEM

Storage library subsystems provide large capacity secondary storage to modern computing environments. Such storage library subsystems typically employ robotic control mechanisms to physically manage storage media cartridges used by host computers system.

A plurality of storage media cartridges are stored within the storage library subsystem. Each storage media cartridge is in a particular slot in the library subsystem. Each slot is identifiable by its physical position in the library subsystem. Each cartridge is typically uniquely identified by a machine readable label. The subsystem maintains inventory information to associate a particular cartridge with a particular slot in the subsystem.

Responsive to a host computer system request, an appropriate storage media cartridge is physically retrieved from its associated slot in the library, moved to an appropriate media read/write device for processing, and inserted into that device. Conversely, when the use of the storage media cartridge is complete, the cartridge is retrieved by the robotic mechanisms from the read/write device, moved adjacent its associated slot according the inventory maintained by the subsystem, and inserted into the storage slot of the library ready for future use in response to another host computer system request.

Over time, computing environments have tended to become smaller and less centralized. Prior storage library subsystems were often costly, complex, and bulky. While arguably appropriate for centralized large data processing environments, prior storage library subsystems were inappropriate in the more modern decentralized workgroup environments. In these environments, reduced costs, complexity, and size of storage library subsystems are essential features.

Prior storage library subsystems often were configured with storage media cartridge slots arranged in circular or cylindrical arrays. This wasted valuable floor or desk space and introduced the mechanical complexities commonly associated with achieving and tracking accurate, repeatable curvilinear motion. Complex rotating robotic arms and robotic cartridge hands or grippers were the norm in these devices.

Mechanical problems can arise in such a storage library subsystem when retrieving a storage media cartridge from a storage slot or media read/write device or when inserting a cartridge into a storage slot or media read/write device. For example, if the robotic mechanism attempts to insert a cartridge into a slot, but the slot is misaligned in some manner, the robotic mechanism may be unable successfully to insert the cartridge into the slot or may drop or damage the cartridge.

In typical larger storage library subsystems, common to prior designs, the frequency of such problems is minimized by precise manufacturing tolerances. Such precise manufacturing tolerances add cost and complexity to the storage library subsystem.

To increase overall capacity without increasing physical size of the storage library subsystem, many storage libraries use removable storage holders or magazines in which a plurality of storage media cartridges may be held. Schneider et al., in U.S. Pat. No. 5,231,552 (issued Jul. 27, 1993), disclose a typical removable magazine for use in such storage library subsystems. This increases the overall storage capacity by permitting the user to store additional populated magazines external to the storage library subsystem (offline from robotic access by the library). When a externally stored magazine is required, the user removes a magazine from the storage library and substitutes the desired magazine into the library subsystem.

This feature of removability tends to exacerbate the mechanical tolerance problems identified above. A magazine may be unintentionally, manually inserted into the library subsystem somewhat askew from a nominal position. This skewed position may cause mechanical misalignment of the robotic mechanisms and the storage slots in the magazine. Though this misalignment may be reduced by mechanical components which force the magazine to be better seated, such mechanisms increase the costs and complexity of the storage library subsystem. Furthermore, many prior magazines were circular or cylindrical in configuration, with the attendant problems noted above.

One approach to resolving some of these problems could be to physically sense the precise physical position of each slot or magazine to adjust the robotic mechanism for mechanical misalignments of each slot or magazine. Physical sensing could be performed mechanically or optically. Such a solution would dramatically increase the costs and complexities of the storage library subsystem.

From the above discussion, it is evident that there is a need for a simple, low cost apparatus and associated methods to maximize use of valuable space and to minimize mechanical misalignments between robotic positioners and the slots they serve.

SOLUTION

The present invention solves the above problems and thereby advances the art by providing simpler apparatus and corresponding methods to maximize use of valuable storage space and to minimize mechanical misalignments. The present invention comprises a storage library subsystem in which the storage media slots and media read-write devices are arranged in linear arrays and in which all movement of the robotic cartridge manipulator is linear in nature. This results in a highly compact storage library subsystem, one that can fit easily and comfortably on a desktop.

The present invention utilizes a multi-ported robotic cartridge manipulator. This manipulator takes the form of a robotic shuttle that is capable of accepting a storage media cartridge in one port and passing the cartridge out of the same port or out of one or more other ports, holding the cartridge safe and secure in the interim. In a preferred embodiment, the robotic shuttle has two ports disposed opposite one another. Either port is capable of accepting or ejecting a storage media cartridge. The shuttle is thus capable of retrieving storage media cartridges from, or feeding storage media cartridges to, media read-write devices or magazines disposed on either side of the shuttle.

A preferred embodiment of the dual-ported robotic shuttle has a rocker beam rotatably attached to the frame of the shuttle. One end of the rocker beam protrudes out of one port, and the other end of the rocker beam protrudes out of the other port. The ends and the center of the rocker beam are fitted with drive rollers capable of rotation under power. When the rocker beam is rotated in the direction of a media storage cartridge captive in a magazine or media read/write device, and the drive rollers activated, the drive roller at the end of the beam contacts the cartridge and moves it into the robotic shuttle, where it comes under control of the central drive roller. The cartridge is expelled from the robotic shuttle by continuing or reversing this process.

The present invention comprises a robotic shuttle of the above type in combination with at least one media read/write device and at least one storage media cartridge magazine. The media read/write device is positioned so that it may be accessed by at least one port of the robotic shuttle. The storage media cartridge magazine is positioned to that it may be accessed by at least one other port of the robotic shuttle. The library storage subsystem of the invention is capable of moving a storage media cartridge not only from a magazine slot to the media read-write device or vice versa, but also from one slot of the magazine to any empty slot of the magazine.

In a preferred embodiment of the invention, a dual-ported robotic shuttle is employed, the ports being disposed on opposite sides of the robotic shuttle. The robotic shuttle is flanked by a rectangular removable cartridge magazine opposite one port and by a linear array of componentry opposite the other port. The linear array comprises a pair of media read/write devices and a fixed cartridge magazine opposite the other port. The library storage subsystem can be configured so that the fixed magazine is accessible only to a system supervisor and invisible to the typical user of the computer attached to the subsystem.

DETAILED DESCRIPTION OF PREFERRED EMBODIMENTS

Apparatus

Figure 1:
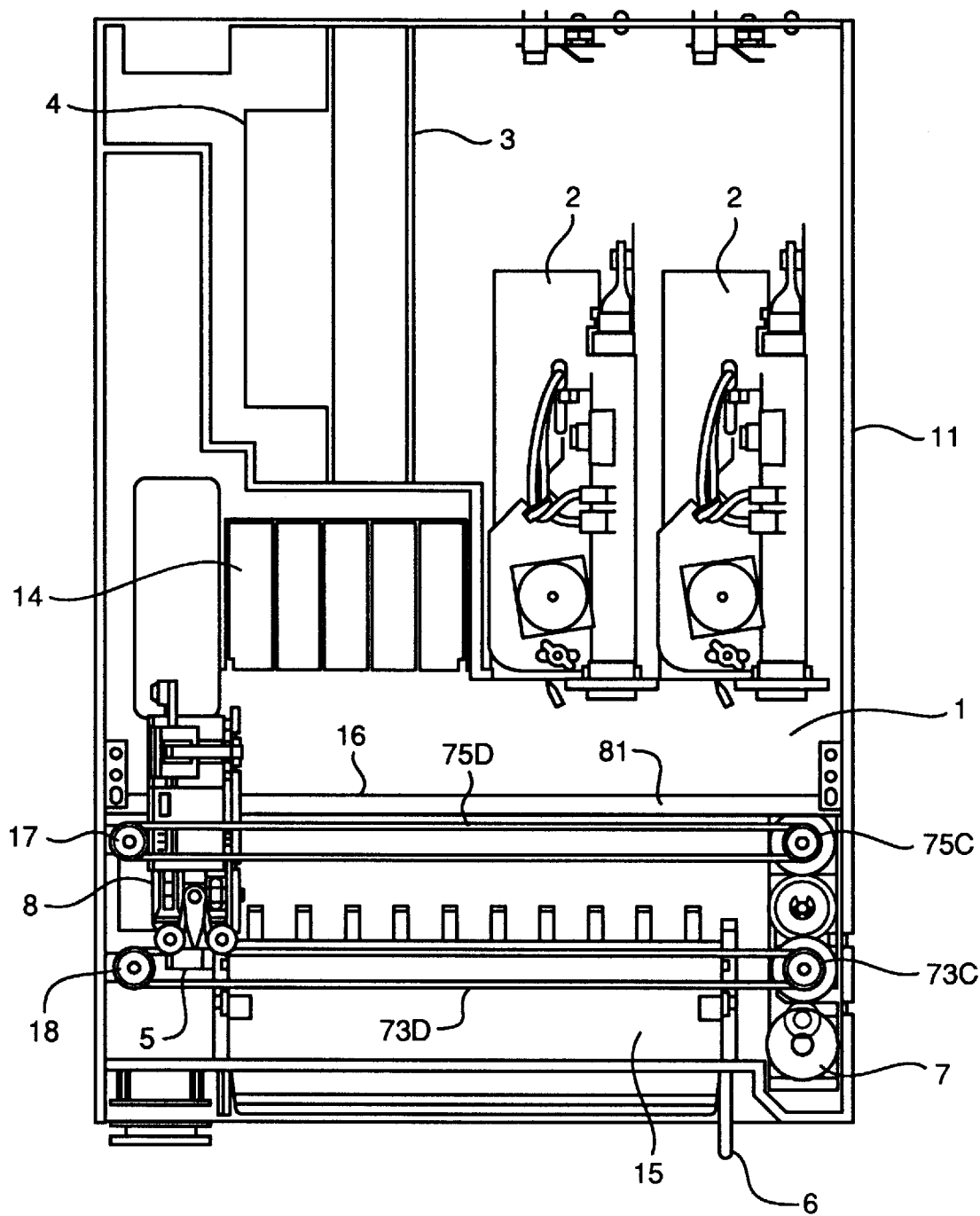
FIG. 1 shows a top view of a storage library subsystem which employs the apparatus and associated methods of the present invention, with the top cover removed.

FIG. 1 illustrates a preferred embodiment of the invention of this application. FIG. 1 is an overhead view of a preferred storage library subsystem of the invention with the top cover removed. Main frame assembly 1 is the foundation of the storage subsystem. The principal constituent of main frame assembly 1 is chassis 11. As illustrated in FIG. 1, the rear of chassis 11 is at the top of the page and the front of chassis 11 is at the bottom.

Chassis 11 holds and positions the principal components of the storage subsystem. These include a bay 15 for a removable magazine assembly 6, a fixed magazine 14, a pair of media read/write devices 2, and a robotic shuttle assembly 8 for moving cartridges among the magazines and read/write devices.

Robotic shuttle assembly 8 rides on linear support rod 81. This rod extends from the left side of chassis 11 to the right side of chassis 11. Robotic shuttle assembly 8 is prevented from rotating about support rod 81 by guide rail 16, which extends from the left side of chassis 11 to the right side of chassis 11 and lies directly beneath support rod 18 (and hence cannot be seen directly in FIG. 1). Guide rail 16 is notched at predetermined points along its length. A robotic shuttle position sensor 85 (not shown) attached to the underside of robotic shuttle assembly 8 straddles guide rail 16 and "reads" the rail as the robotic shuttle assembly moves transversely in chassis 11. The signal from robotic shuttle position sensor 85 is used by the subsystem to monitor the position of robotic shuttle assembly 8 relative to the subsystem magazines and read/write devices.

Robotic shuttle assembly 8 is moved transversely in chassis 11 by robotic shuttle drive belt 75*d*. This belt is driven by robotic shuttle drive pulley 75*c* in main drive assembly 7 and loops around robotic shuttle drive idler pulley 17, which is rotatably attached to the left side of chassis 11. The rearward length of robotic shuttle drive belt 75*d* is attached to robotic shuttle assembly 8, while the forward length of the belt passes freely through robotic shuttle assembly 8. Clockwise rotation of robotic shuttle drive pulley 75*c* causes clockwise rotation of robotic shuttle drive belt 75*d*, which translates into linear motion of robotic shuttle assembly 8 from left to right in chassis 11. Conversely, counter-clockwise rotation of robotic shuttle drive pulley 75*c* causes counter-clockwise rotation of robotic shuttle drive belt 75*d*, which translates into linear motion of robotic shuttle assembly 8 from right to left in chassis 11.

One of ordinary skill in the art will readily recognize several equivalent mechanical configurations and control apparatus to provide controlled linear motion of shuttle assembly 8 within chassis 11. For one example, a DC motor with a pinion gear could be fitted directly on robotic shuttle assembly 8, and a rack fitted to chassis 11 so as to mesh with the pinion gear. Robotic shuttle assembly 8 would move along support rod 81 when the DC motor was activated. The direction of motion would be controlled by controlling the polarity of the voltage applied to the DC motor.

Robotic shuttle assembly 8 has two opposed ports for receipt and ejection of storage media cartridges. One port of robotic shuttle assembly 8 faces the rear of chassis 11, and the other port of robotic shuttle assembly 8 faces the front of chassis 11. There is suffcient space between the ports of robotic shuttle assembly 8 to store a media storage cartridge securely during movement of robotic shuttle assembly 8.

The magazines and read/write devices of the storage subsystem are placed in close proximity to one of the two planes traced by the front and rear ports as robotic shuttle assembly 8 moves transversely in chassis 11. Thus, the rear of removable magazine assembly 6, when secured in its bay 15, is spaced a small distance from the plane traced by the front port of robotic shuttle assembly 8 as the robotic shuttle moves transversely in chassis 11, permitting safe and expeditious transfer of a cartridge from removable magazine assembly 6 to robotic shuttle assembly 8 through the front port of robotic shuttle assembly 8 (or vice versa). Similarly, the front of fixed magazine 14 and the fronts of media read/write devices 2 are spaced a small distance from the plane traced by the rear port of robotic shuttle assembly 8 as the robotic shuttle moves transversely in chassis 11, permitting safe and expeditious transfer of a cartridge from the magazine or the read/write devices to robotic shuttle assembly 8 through the rear port of robotic shuttle assembly 8 (or vice versa).

Mechanisms in robotic shuttle assembly 8 for effecting transfer of a cartridge to or from robotic shuttle assembly 8 are controlled by rocker beam drive belt 73*d*. These mechanisms, which indude a rocker beam assembly 87, are discussed later in connection with FIG. 3 and following diagrams.

As shown in FIG. 1, rocker beam drive belt 73*d* is driven by rocker beam drive pulley 73*c* in main drive assembly 7 and loops around rocker beam drive idler pulley 18, which is rotatably attached to chassis 11. The rearward length of rocker beam drive belt 73*d* passes through pulleys attached to robotic shuttle assembly 8, while the forward length of the belt passes freely around the front end of robotic shuttle assembly 8. Rotation of rocker beam drive pulley 73*c* causes rotation of rocker beam drive belt 73*d*, which activates the cartridge transfer mechanisms of robotic shuttle assembly 8 when the robotic shuttle assembly 8 is locked in place by braking of robotic shuttle drive pulley 75*c* and consequent immobilization of robotic shuttle drive belt 75*c*.

One of ordinary skill in the art will readily recognize several equivalent mechanical configurations and control apparatus to activate the cartridge transfer mechanisms of robotic shuttle assembly 8. For example, a DC motor could be fixed directly to frame 82 of robotic shuttle assembly 8 and rotatably linked to the cartridge transfer mechanisms. Activation of the DC motor by an external controller would activate the cartridge transfer mechanisms.

Other components of the storage subsystem shown in FIG. 1 include a controller card 3, a power supply 4 and a bar code reader 5. The controller card receives signals from sensors in robotic shuttle assembly 8, processes those signals, and asserts output signals where appropriate for control of the storage subsystem. Controller card 3 is electrically connected to robotic shuttle assembly 8 by ribbon cable 823 (not shown). Power supply 4 supplies DC power to the storage subsystem as a whole. Bar code reader 5 is attached to chassis 11 in dose proximity to the plane traced by the front port of robotic shuttle assembly 8 as the assembly moves transversely in chassis 11, with the reader elements of bar code reader 5 facing the front port of robotic shuttle assembly 8. This allows bar code reader 5 to read a bar code on a cartridge secured in robotic shuttle assembly 8.

Figure 2:
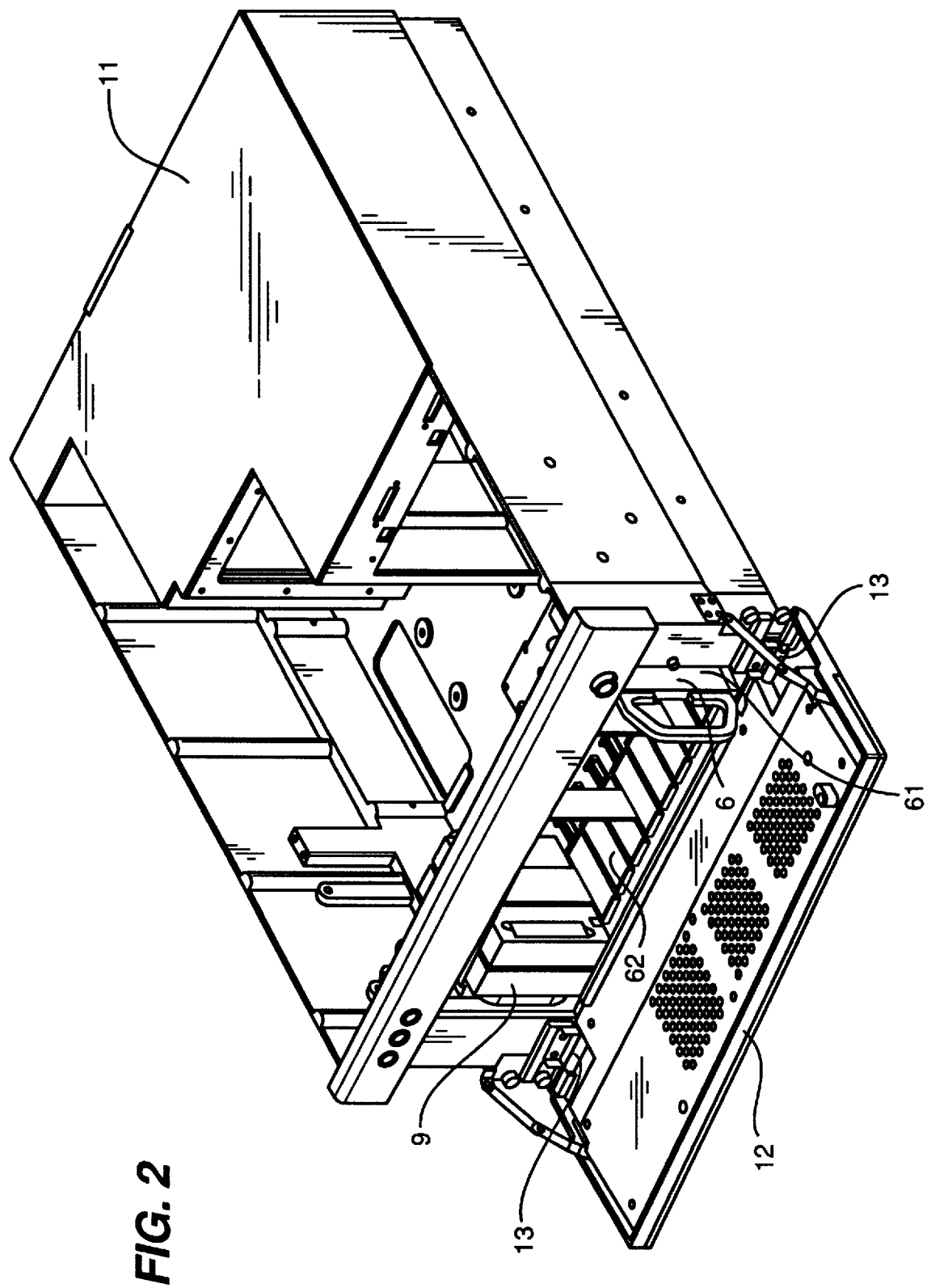
FIG. 2 shows a perspective view of the frame, front cover and removable magazine of the storage library subsystem shown in FIG. 1 with the front cover open.
Figure 3:
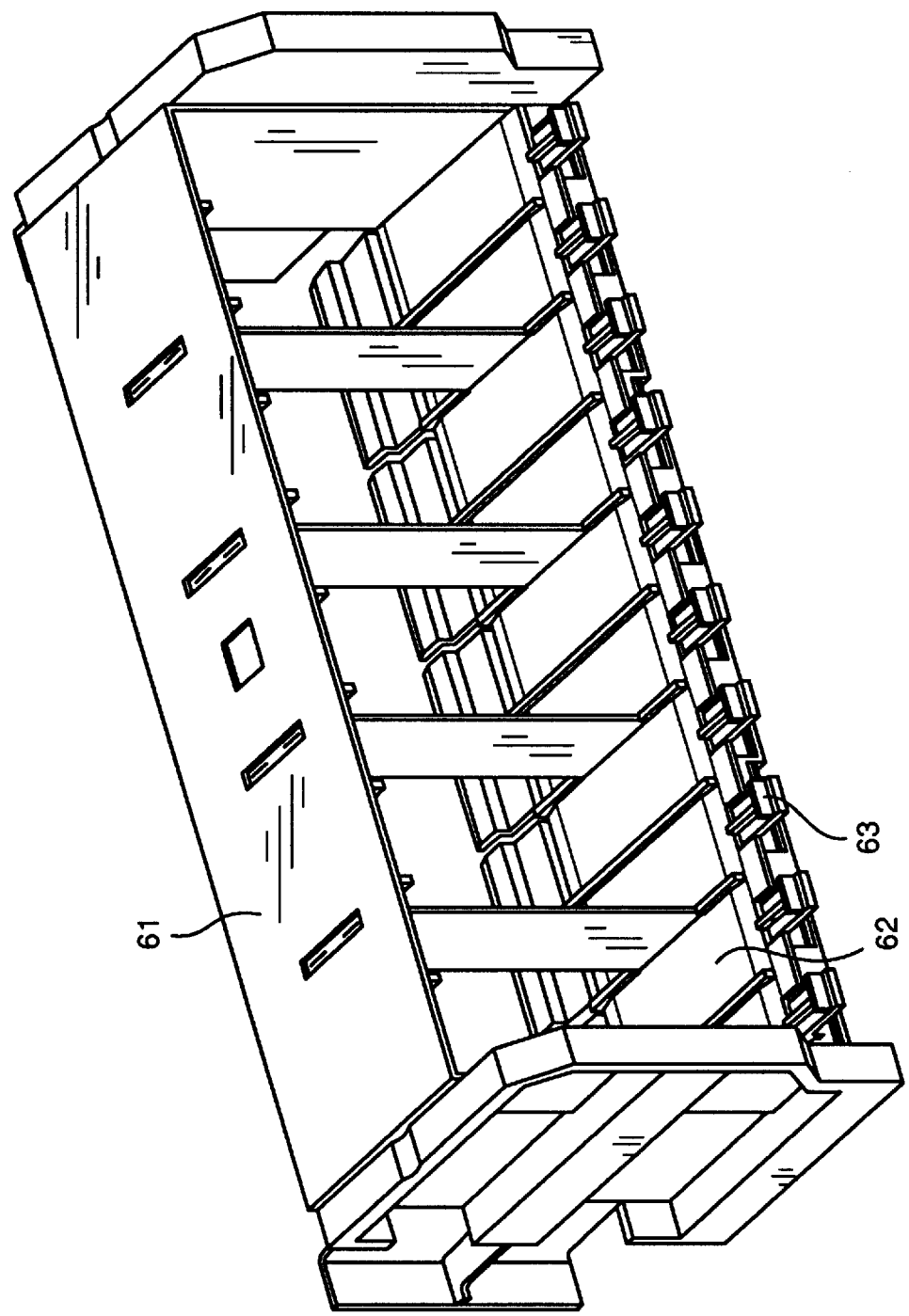
FIG. 3 shows a perspective view of the rear of the removable magazine of the storage library subsystem shown in FIG. 1.

FIG. 2 shows a perspective view of the chassis 11 and front cover 12 of the storage library subsystem shown in FIG. 1, with front panel 12 opened to reveal the front of removable magazine assembly 6 inserted in its bay 15. Removable magazine assembly 6 comprises a chassis 61 provided with a linear array of slots 62 for storage of storage media cartridges 9. FIG. 3 shows two cartridges 9 inserted in two slots 62 of removable magazine assembly 6.

FIG. 3 shows a perspective view of the rear of removable magazine assembly 6. The rear openings of magazine slots 62 are clearly visible. A rear latching lever 63 is provided at the bottom of each slot 62. The rear latching lever 63 secures a cartridge 9 in slot 62 during insertion, removal and transportation of the removable magazine assembly 6. A cartridge 9 can be removed from the rear opening of slot 62 by depressing rear latching lever 63 and pulling cartridge 9 over the depressed rear latching lever 63.

Figure 4:
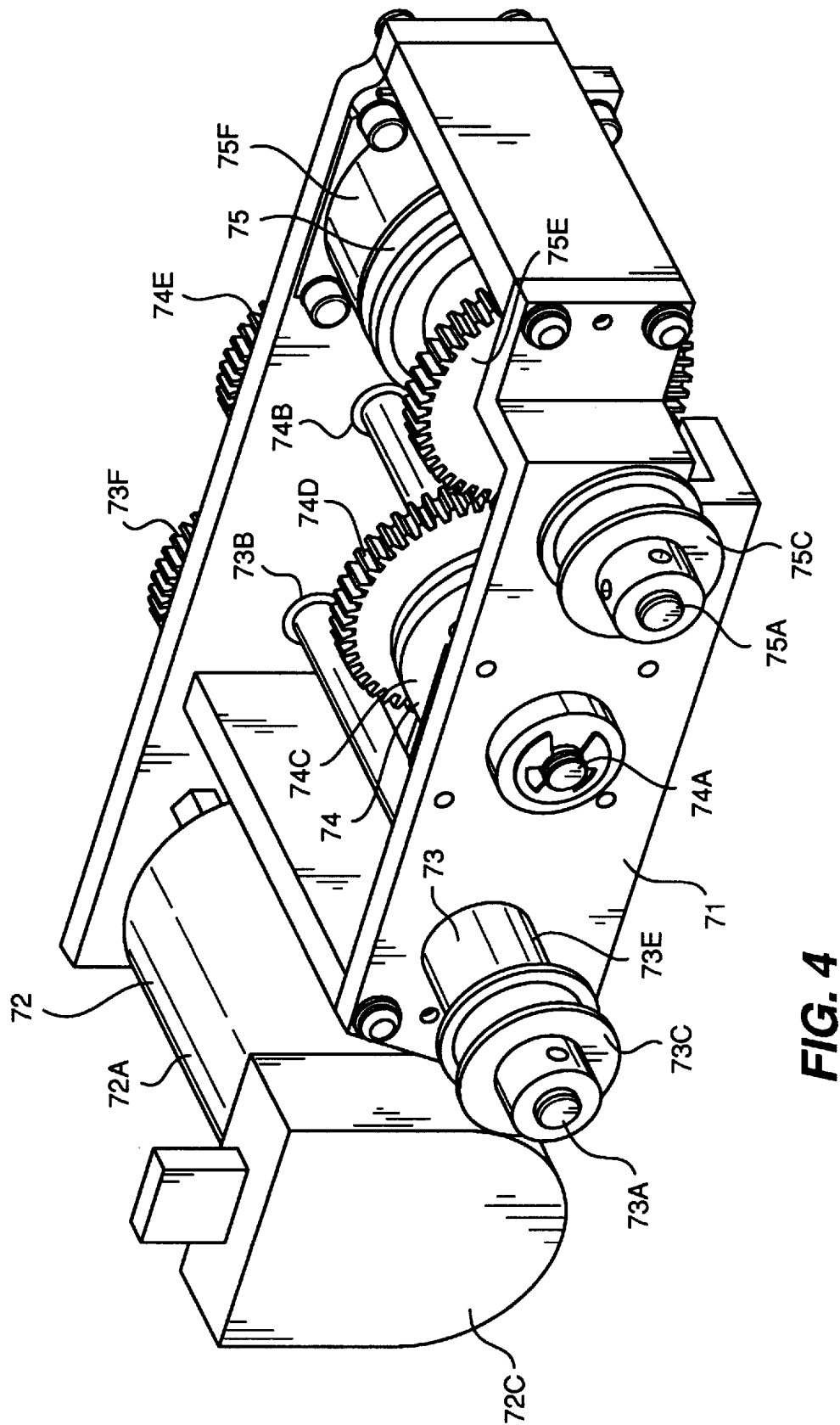
FIG. 4 shows a perspective view of the main drive mechanism of the storage library subsystem shown in FIG. 1.

FIG. 4 shows a perspective view of the main drive assembly 7 of the storage library subsystem shown in FIG. 1. As noted, the main drive assembly provides rotational power to drive robotic shuttle assembly 8 transversely in chassis 11 and to operate the cartridge transfer mechanisms of robotic shuttle assembly 8.

The components of main drive assembly 7 are disposed on and supported by frame 71. Motor assembly 72 comprises a DC motor 72*a*, a drive shaft encoder 72*c* for measuring the angular travel of the drive shaft of DC motor 72*a*, and drive gear 72*d* (not shown) for transmitting the rotary motion of the drive shaft of DC motor 72*a* to other components of the power train of main drive assembly 7.

Rotary motion of drive gear 72*d* is transmitted through transfer gear 76*a* (not shown) to rocker beam drive gear 73*f* of robotic shuttle rocker beam drive assembly 73. This assembly further comprises rocker beam drive shaft 73a and rocker beam drive pulley 73c. Rocker beam drive shaft 73a is mounted vertically and rotatably in frame 71. Rocker beam drive gear 73f is mounted to the bottom end of drive shaft 73a, while rocker beam drive pulley 73c is mounted to the top end of rocker beam drive shaft 73a. Rotation of rocker beam drive gear 73f causes corresponding rotation of rocker beam drive shaft 73a and rocker beam drive pulley 73c. This in turn drives rocker beam drive belt 73d, causing robotic shuttle assembly 8 to retrieve or eject a cartridge 9 in the manner previously discussed.

Rotary motion of drive gear 73f also causes corresponding rotary motion of drive gear 74e of robotic shuttle drive clutch assembly 74. This assembly further comprises a drive clutch shaft 74a, a drive clutch gear 74d and a drive clutch 74c. Drive clutch shaft 74a is mounted vertically and rotatably in frame 71. Drive clutch gear 74e is mounted to the bottom end of drive clutch shaft 74a, while drive clutch 74c is mounted to the top end of drive clutch shaft 74a and to frame 71. Drive dutch gear 74d is mounted to drive clutch 74c. Rotation of drive gear 74e causes corresponding rotation of drive clutch shaft 74a and clutch plates of drive clutch 74c. Drive clutch gear 74d also rotates, but only when drive clutch 74c is engaged.

Rotary motion of drive clutch gear 74d also causes corresponding rotary motion of robotic shuttle drive gear 75e of robotic shuttle drive assembly 74. This assembly further comprises a robotic shuttle drive shaft 75a, a robotic shuttle drive brake 75f, and a robotic shuttle drive pulley 75c. Robotic shuttle drive shaft 75a is mounted vertically and rotatably in frame 71. Robotic shuttle drive gear 74e is mounted at the middle of robotic shuttle drive shaft 75a, robotic shuttle drive brake 75f is mounted to the bottom end of robotic shuttle drive shaft 75a and to frame 71, and robotic shuttle drive pulley 75c is mounted to the top end of robotic shuttle drive shaft 75a. Rotation of robotic shuttle drive gear 75e causes corresponding rotation of robotic shuttle drive shaft 75a and robotic shuttle drive pulley 75c. This in turn drives robotic shuttle drive belt 75d, causing robotic shuttle assembly 8 to move transversely in chassis 11 in the manner previously discussed. Robotic shuttle assembly 8 is locked in place by deactivation of drive clutch 74c and activation of robotic shuttle drive brake 75f, which locks robotic shuttle drive shaft 75a and robotic shuttle drive pulley 75c, immobilizing robotic shuttle drive belt 75c and robotic shuttle assembly 8.

One of ordinary skill in the art will readily recognize several equivalent mechanical configurations and control apparatus to provide controlled linear motion of shuttle assembly 8 within chassis 11. For one example, a DC motor with a pinion gear could be fitted directly on robotic shuttle assembly 8, and a rack fitted to chassis 11 so as to mesh with the pinion gear. Robotic shuttle assembly 8 would move along support rod 81 when the DC motor was activated. The direction of motion would be controlled by controlling the polarity of the voltage applied to the DC motor.

Figure 5:
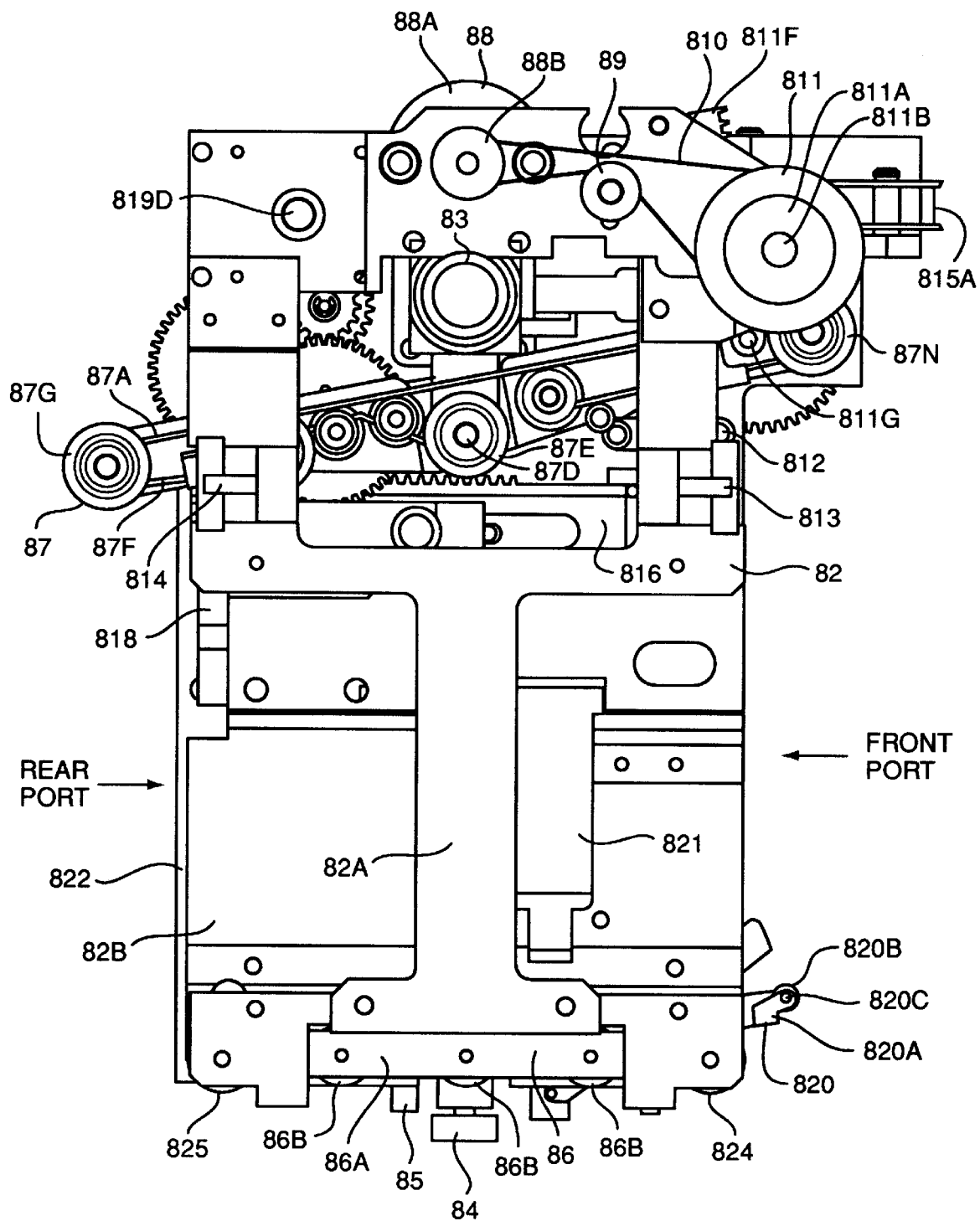
FIG. 5 shows a left-side view of the robotic shuttle mechanism of the storage library subsystem shown in FIG. 1.

FIG. 5 shows a view of the left side of robotic shuttle assembly 8. The assembler comprises a robotic shuttle frame 82 for supporting and positioning the other components of robotic shuttle assembly 8. Frame 82 is fitted with support rod bearing 83, which rides on support rod 81 in the manner previously discussed.

Frame 82 is fitted on its underside with position sensor 85. As noted, this position sensor straddles a notched guide rail 16 (not shown) and "reads" the rail as robotic shuttle assembly 8 moves transversely in chassis 11. Transverse motion of robotic shuttle assembly 8 is facilitated by guide bearing 84, which rides on the front side of guide rail 16.

Frame 82 comprises a left side 82a and a right side 82b, with front and rear ports as shown. A cartridge 9 is secured in frame 82 between left side 82a and right side 82b and below rocker beam assembly 87.

Rocker beam assembly 87 is rotatably attached to right side 82b of frame 82. Frame 87a of rocker beam assembly 87 rotates about a point defined by the center of rocker beam drive shaft 87d in a plane parallel to the plane defined by right side 82b of frame 82. Frame 87a of rocker beam assembly 87 is fitted with rotatable drive rollers, including first rear drive roller 87g, central drive roller 87e, and front drive roller 87n. Central drive roller 87e is connected to and rotated by the left end of rocker beam drive shaft 87d. Central drive roller 87e transmits rotational motion to first rear drive roller 87g and front drive roller 87n through rocker beam drive belt 87f. Depending on the angular position of frame 87a, one of these drive rollers contacts a cartridge 9 and pulls it into or pushes it out of robotic shuttle assembly 8.

In FIG. 5, frame 87a is positioned so that first rear drive roller 87g can contact a cartridge 9 and pull it into or push it out of the rear port of robotic shuttle assembly 8. Rotation of frame 87a in a clockwise direction would put front drive roller 87n in a position to contact a cartridge 9 and pull it into or push it out of the front port of robotic shuttle assembly 8. Position sensors 813 and 814 detect the presence of cartridge in the front and rear ports, respectively, and further detect the presence of one end of rocker beam frame 87a when it is rotated to contact a cartridge but no cartridge is present to be contacted.

Rotation of rocker beam frame 87a is accomplished and controlled by rocker beam positioning assembly 811. This assembly comprises a rack 811f, which is attached to rocker beam frame 87a with a rack pivot pin 811g. The longitudinal axis of rack 811f is roughly vertical. Rack 811f is driven by pinion gear 811d, which in turn is driven by pulley 811a through drive shaft 811b. Pulley 811a is driven by rocker beam positioning belt 810, which in turn is driven by pulley 88b of rocker beam positioning assembly 88. Pulley 88b is driven by DC motor 88a. Power to drive the drive rollers of rocker beam assembly 87 is provided by a power train that includes a first idler pulley 815a and a complementary second idler pulley 815b (not shown).

One of ordinary skill in the art will readily recognize several equivalent mechanical configurations and control apparatus to provide power to the drive rollers of rocker beam assembly 87. For example, a DC motor could be fixed directly to frame 82 of robotic shuttle assembly 8 and linked directly to drive shaft 87c. Activation of the DC motor by an external controller would activate the drive rollers of rocker beam assembly 87.

Right side 82 of robotic shuttle frame 82 is provided with a magazine release lever assembly 820. This assembly manipulates the rear latching levers 63 disposed at the bottom rear of the slots 62 in removable magazine assembly 6. Assembly 820 comprises a magazine release lever 820a rotatably attached to right side 82b of robotic shuttle frame 82 by pivot pin 820d. The front end of lever 820a protrudes beyond the lower front of robotic shuttle frame 82 for contacting and depressing a rear latching lever 63. This end of lever 820a is fitted with a magazine release lever roller 820b to facilitate the manipulation of rear latching lever 63. The rear end of lever 820a is connected to the shaft of magazine release lever drive solenoid 821 by solenoid connector pin 820e. Actuation of solenoid 821 forces the front end of lever 820a downward, depressing rear latching lever 63 so that a cartridge 9 may be removed from its storage slot 62, as previously discussed.

Movement of a cartridge 9 into and out of frame 82 is facilitated by front roller 824, rear roller 825 and rollers 86b. Front roller 824 and rear roller 825 are rotatably attached to frame 82. Rollers 86b are rotatably attached to subframe 86a, which in turn is attached at the bottom of frame 82 in the passage formed by left side 82a, right side 82b and the bottom of frame 82. A cartridge 9 rolls on one or more of front roller 824, rear roller 825 and rollers 86b as it enters or exits the robotic shuttle assembly 8.

Figure 6:
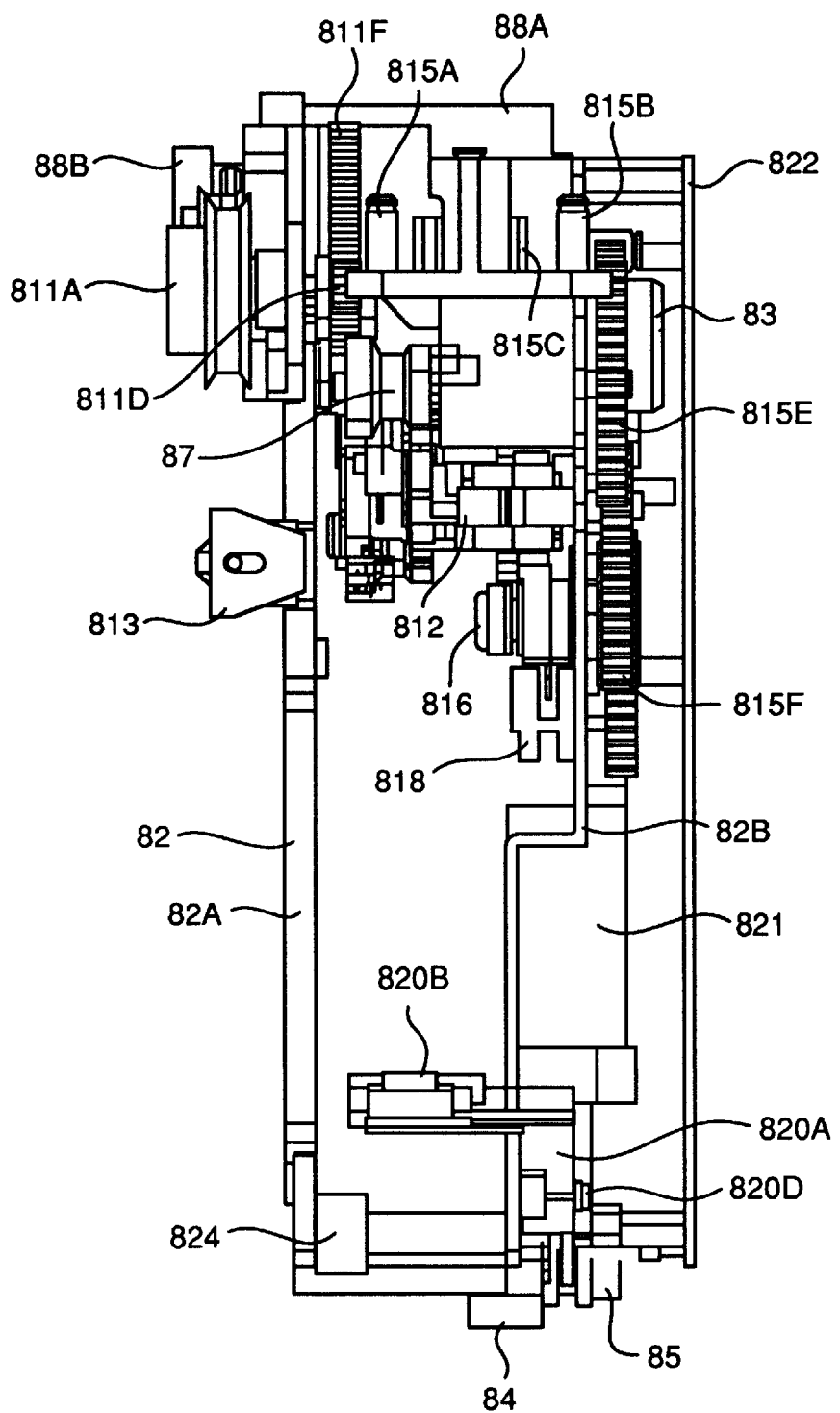
FIG. 6 shows a front view of the robotic shuttle mechanism of the storage library subsystem shown in FIG. 1.

FIG. 6 shows a front view of robotic shuttle mechanism 8 looking directly into its front port. Pulleys 815a and 815b are shown as pins only. The back length of rocker beam drive belt 73d (not shown) is threaded around the front side of second idler pulley 815b, around the back side of first drive gear 815c, and back out around the front side of first idler pulley 815a (see also FIG. 1). When robotic shuttle mechanism 8 is restrained from movement along support rod 81, movement of rocker beam drive belt 73d translates into rotation of first drive gear 815c. This rotation is transmitted by a drive train to drive shaft 87d, which provides drive power to the drive rollers of rocker beam assembly 87. This drive train is seen grouped along the right side of right side 82b of robotic shuttle frame 82.

Figure 7:
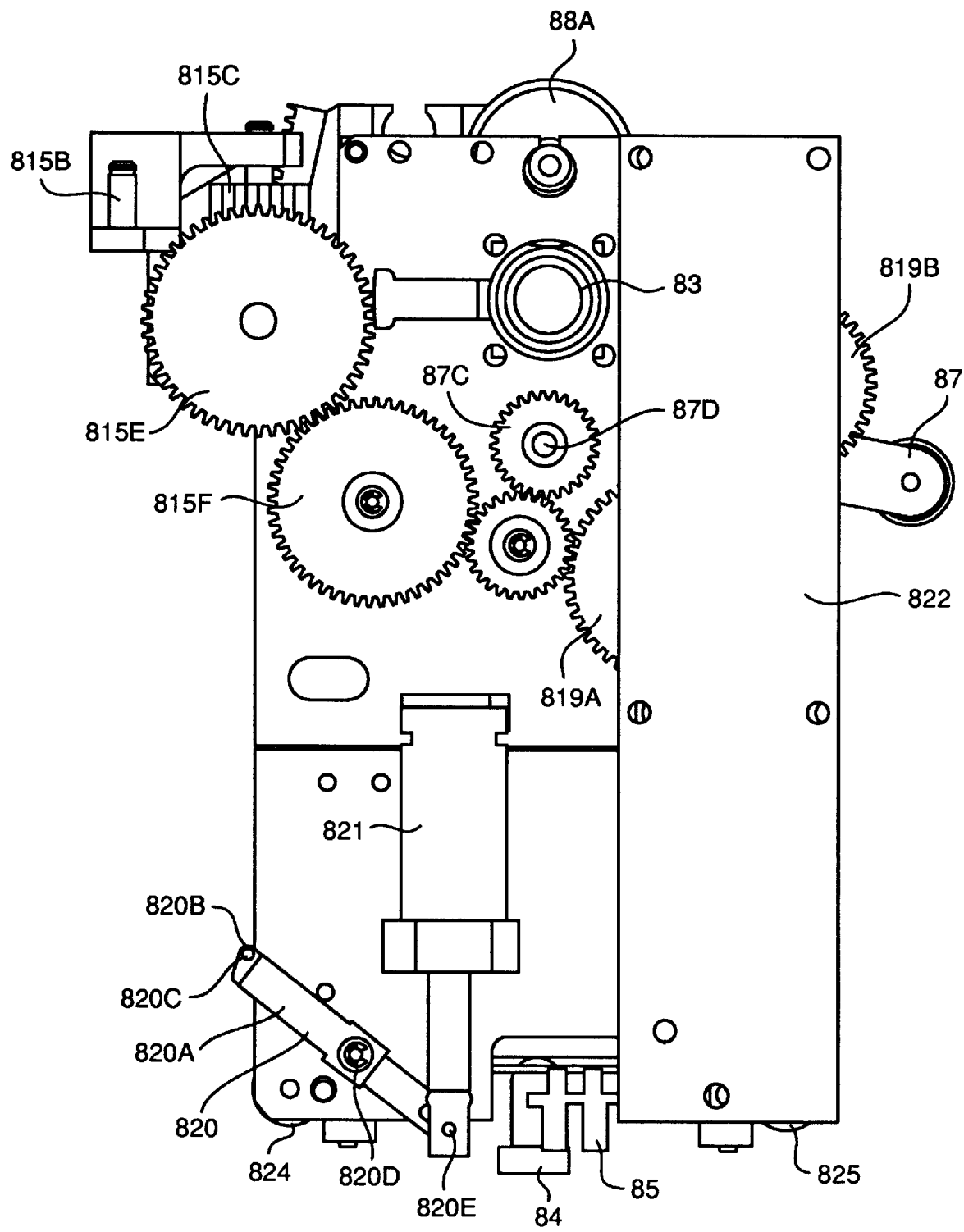
FIG. 7 shows a right-side view of the robotic shuttle mechanism of the storage library subsystem shown in FIG. 1.

The drive train is also visible in FIG. 7, a view of robotic shuttle assembly 8 from the right side. The drive train comprises second drive gear 815d (not shown), third drive gear 815e, fourth drive gear 815f, fifth drive gear 815g—each of which is rotatably mounted on right side 82b of frame 82—and rocker beam drive gear 87c, which is fixedly mounted to the right end of rocker arm drive shaft 87d. FIG. 7 also shows printed circuit board 822. This board consolidates all electrical signals to and from robotic shuttle assembly 8 into a single connector (not shown). That connector mates with ribbon cable 823 (not shown), which connects at its other end to controller board 3.

Figure 8:
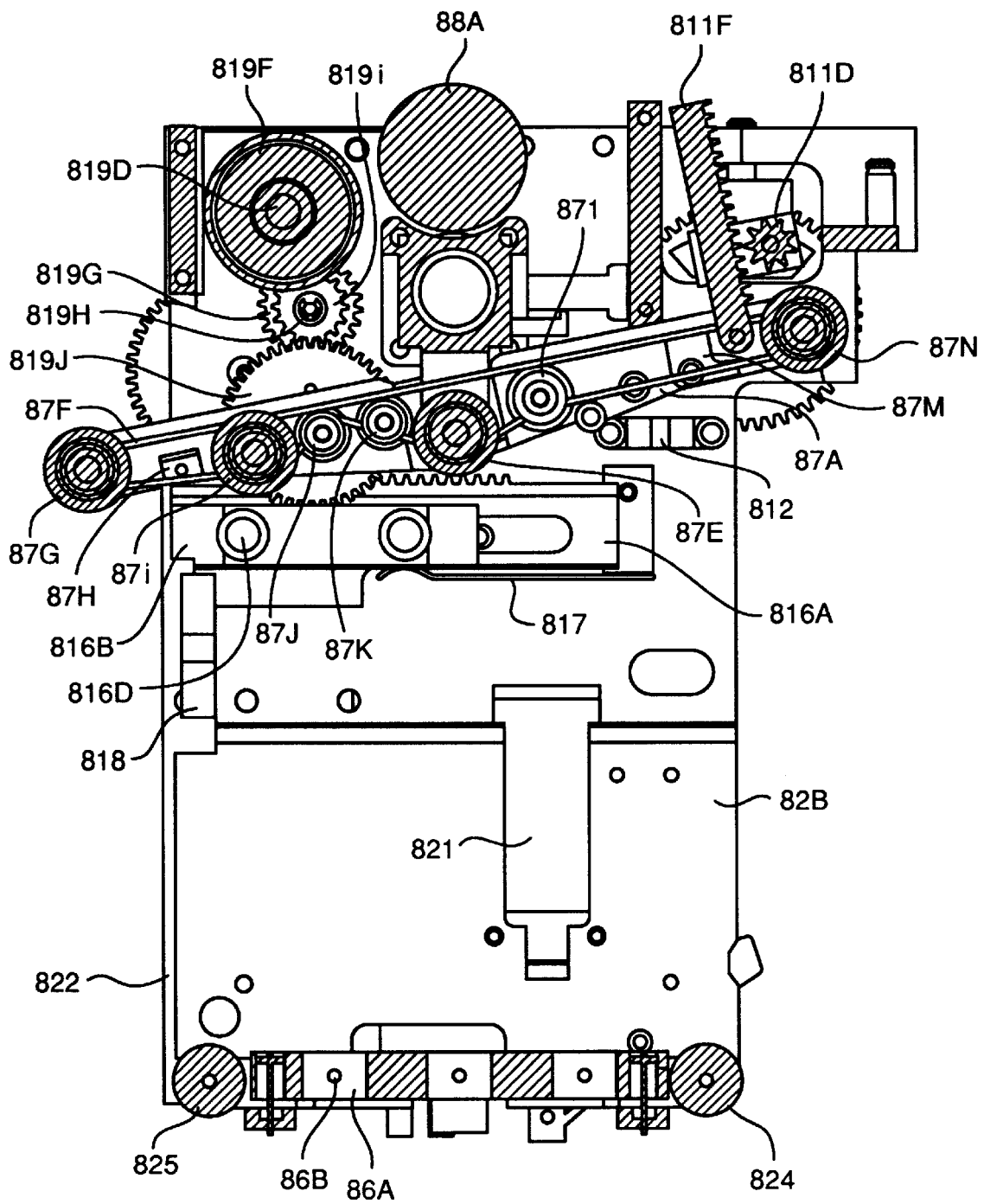
FIG. 8 shows a cross-sectional left-side view of the robotic shuttle mechanism of the storage library subsystem shown in FIG. 1.

FIG. 8 shows a cross-sectional left-side view of the robotic shuttle assembly 8. The cross section is taken through plane Y—Y of FIG. 6. As shown in FIG. 8, the right side 82b of frame 82 is fitted with a cartridge pusher arm 816a, which is held in place and positioned by cartridge pusher arm retainer 816b. Cartridge pusher arm 816a is used to push a cartridge 9 into a media read-write device. Cartridge pusher arm 816a has teeth disposed along its top surface. These teeth mesh with the teeth of eighth drive gear 819i (not shown), the last in a series of drive gears comprising drive gears 819a, 819b, 819c, 819e, 819f, 819g, 819h, as well as drive gear 819i itself. A drive clutch 819e is interposed between third drive gear 819c and fourth drive gear 819d such that rotation of third drive gear 819c is transmitted to fourth drive gear 819d only when drive clutch 819e is engaged.

When drive clutch 819e is engaged, and eighth drive gear 819i rotated, cartridge pusher arm 816a is moved laterally. Clockwise rotation of eighth drive gear 819i causes cartridge pusher arm 816a to move out of the rear port of robotic shuttle assembly 8. Counterclockwise rotation of eighth drive gear 819i causes cartridge pusher arm 816a to move back into the rear port. Cartridge pusher position sensor 818 is used to sense both full extension and full retraction of cartridge pusher arm 816a.

FIG. 8 also shows additional detail of rocker beam assembly 87. A second rear drive roller 87i is positioned between first rear drive roller 87g and central drive roller 87e to assist in inserting a cartridge 9 into a media read/write device 2, as well as in extracting a cartridge 9 from a media read/write device 2. Second rear drive roller 87i is driven by rocker beam drive belt 87f, as is first rear drive roller 87g. Rocker beam frame 87a also is fitted with a first rear idler pulley 87j, a second rear idler pulley 87k, and a front idler pulley 87l, each of which is rotatably mounted to frame 87a. These idler pulleys assist in the smooth transmission of rotational movement from central drive roller 87e to the other drive rollers disposed on frame 87a by way of rocker beam drive belt 87f.

A parts list for the preferred embodiment of the invention discussed above is set forth below. The parts list is keyed to the reference numbers utilized above.

Preferred Embodiment Parts List

| Ref. | Component or Element | No. |
|---|---|---|
| 1 | main frame assembly | 1 |
| 11 | chassis | 1 |
| 12 | front panel | 1 |
| 13 | hinges | 2 |
| 14 | fixed magazine | 1 |
| 15 | removable magazine bay | 1 |
| 16 | robotic shuttle guide rail | 1 |
| 17 | robotic shuttle drive idler pulley | 1 |
| 18 | rocker beam drive idler pulley | 1 |
| 2 | media read/write device | 2 |
| 3 | controller board | 1 |
| 4 | power supply | 1 |
| 5 | bar code reader | 1 |
| 6 | removable magazine assembly | 1 |
| 61 | chassis | 1 |
| 62 | slot | 10 |
| 63 | rear latching lever | 10 |
| 7 | main drive assembly | 1 |
| 71 | frame | 1 |
| 72 | motor assembly | 1 |
| 72a | DC motor | 1 |
| 72b | drive shaft bearing | 1 |
| 72c | drive shaft encoder | 1 |
| 72d | drive gear | 1 |
| 73 | rocker beam drive assembly | 1 |
| 73a | rocker beam drive shaft | 1 |
| 73b | rocker beam drive shaft bearings | 2 |
| 73c | rocker beam drive timing pulley | 1 |
| 73d | rocker beam drive timing belt | 1 |
| 73e | rocker beam drive spacer | 1 |
| 73f | rocker beam drive gear | 1 |
| 74 | robotic shuttle drive clutch assembly | 1 |
| 74a | drive clutch shaft | 1 |
| 74b | drive clutch shaft bearings | 2 |
| 74c | drive clutch | 1 |
| 74d | drive clutch gear | 1 |
| 74e | drive gear | 1 |
| 75 | robotic shuttle drive assembly | 1 |
| 75a | robotic shuttle drive shaft | 1 |
| 75b | robotic shuttle drive shaft bearings | 2 |
| 75c | robotic shuttle drive pulley | 1 |
| 75d | robotic shuttle drive belt | 1 |
| 75e | robotic shuttle drive gear | 1 |
| 75f | robotic shuttle drive brake | 1 |
| 76 | transfer gear assembly | 1 |
| 76a | transfer gear | 1 |
| 76b | transfer gear shaft | 1 |
| 8 | robotic shuttle assembly | 1 |
| 81 | support rod | 1 |
| 82 | robotic shuttle frame | 1 |
| 82a | left side | 1 |
| 82b | right side | 1 |
| 83 | support rod bearing | 1 |
| 84 | robotic shuttle guide bearing | 1 |
| 85 | robotic shuttle position sensor | 1 |
| 86 | magazine roller assembly | 1 |
| 86a | sub-frame | 1 |

-continued

Preferred Embodiment Parts List

| Ref. | Component or Element | No. |
|---|---|---|
| | 86b wheels | 3 |
| 87 | rocker beam assembly | 1 |
| | 87a frame | 1 |
| | 87b pivot spacer | 1 |
| | 87c drive gear | 1 |
| | 87d drive shaft | 1 |
| | 87e central drive roller | 1 |
| | 87f drive belt | 1 |
| | 87g first rear drive roller | 1 |
| | 87h rear sensor interrupt plate | 1 |
| | 87i second rear drive roller | 1 |
| | 87j first rear idler pulley | 1 |
| | 87k second rear idler pulley | 1 |
| | 87l front idler pulley | 1 |
| | 87m front sensor interrupt plate | 1 |
| | 87n front drive roller | 1 |
| 88 | rocker beam positioning motor assembly | 1 |
| | 88a DC motor | 1 |
| | 88b pulley | 1 |
| 89 | rocker beam positioning idler pulley | 1 |
| 810 | rocker beam positioning belt | 1 |
| 811 | rocker beam positioning assembly | 1 |
| | 811a pulley | 1 |
| | 811b driveshaft | 1 |
| | 811c shaft bearing | 1 |
| | 811d pinion gear | 1 |
| | 811e pinion gear housing | 1 |
| | 811f rack | 1 |
| | 811g rack pivot pin | 1 |
| 812 | rocker beam position sensor | 1 |
| 813 | front magazine position sensor | 1 |
| 814 | rear magazine position sensor | 1 |
| 815 | rocker beam drive gear train | 1 |
| | 815a first idler pulley | 1 |
| | 815b second idler pulley | 1 |
| | 815c first drive gear | 1 |
| | 815d second drive gear | 1 |
| | 815e third drive gear | 1 |
| | 815f fourth drive gear | 1 |
| | 815g fifth drive gear | 1 |
| 816 | cartridge pusher assembly | 1 |
| | 816a cartridge pusher arm | 1 |
| | 816b cartridge pusher arm retainer | 1 |
| | 816c cartridge pusher bearings | 2 |
| | 816d cartridge pusher support pins | 2 |
| 817 | cartridge pusher detent spring | 1 |
| 818 | cartridge pusher position sensor | 1 |
| 819 | cartridge pusher gear train | 1 |
| | 819a first drive gear | 1 |
| | 819b second drive gear | 1 |
| | 819c third drive gear | 1 |
| | 819d fourth drive gear | 1 |
| | 819e drive clutch | 1 |
| | 819f fifth drive gear | 1 |
| | 819g sixth drive gear | 1 |
| | 819h seventh drive gear | 1 |
| | 819i eighth drive gear | 1 |
| 820 | magazine release lever assembly | 1 |
| | 820a magazine release lever | 1 |
| | 820b magazine release lever roller | 1 |
| | 820c magazine release lever roller pin | 1 |
| | 820d magazine release lever pivot pin | 1 |
| | 820e solenoid connector pin | 1 |
| 821 | magazine release lever drive solenoid (with wires) | 1 |
| 822 | printed circuit board | 1 |
| 823 | ribbon cable | 1 |
| 824 | front roller | 1 |
| 825 | back roller | 1 |
| 9 | storage media cartridge | na |

Method

Figure 9:
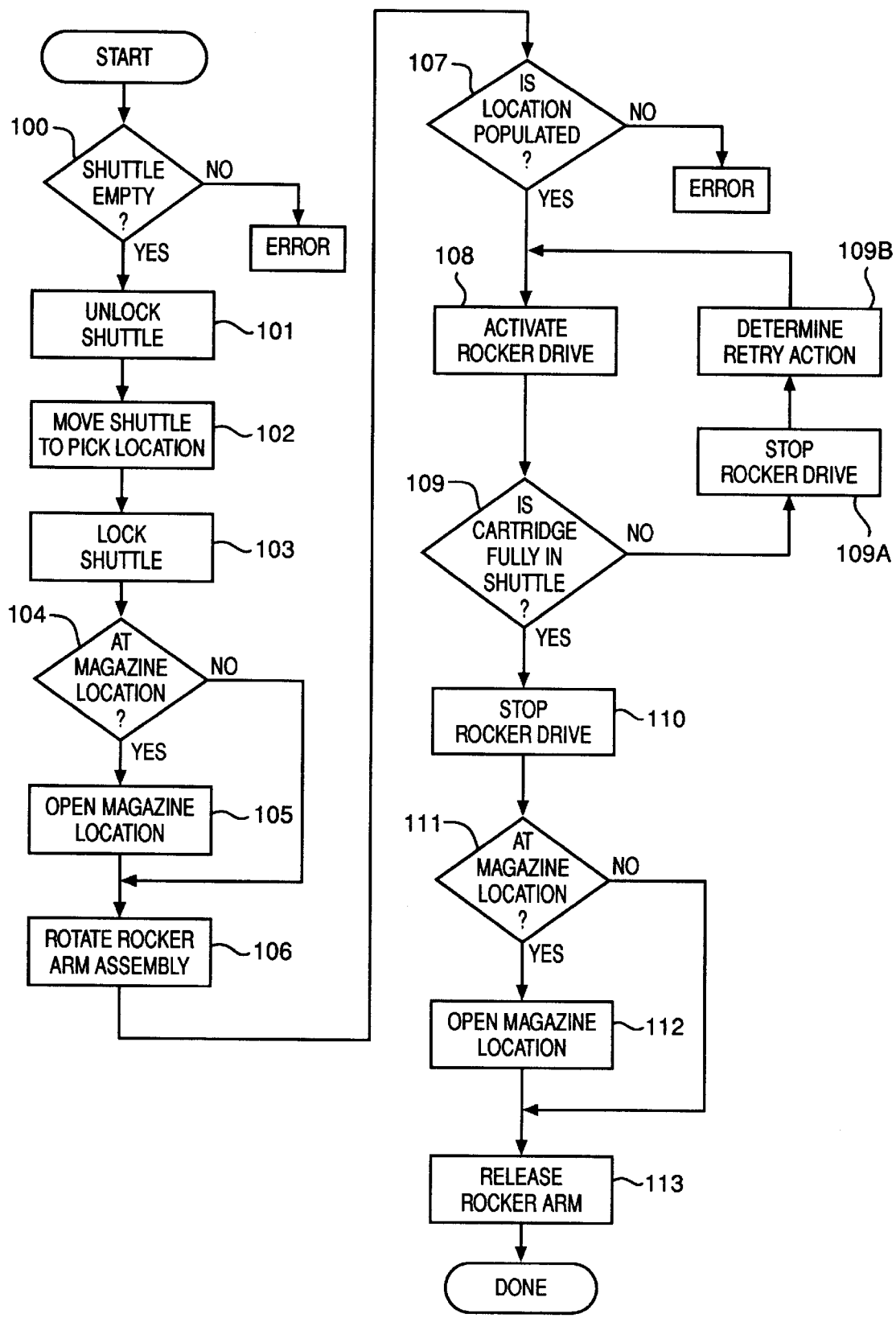
FIG. 9 shows a flowchart of a method of extracting a storage media cartridge from a removable magazine of the storage library subsystem shown in FIG. 1.

FIG. 9 is a flowchart of a preferred method of extracting a cartridge 9 from removable magazine assembly 6. The first step 100 of the method is to verify that robotic shuttle assembly 8 is empty and hence ready to extract a cartridge. This is accomplished with position sensors 813 and 814. If robotic shuttle assembly 8 already holds a cartridge, an error is returned and the storage library subsystem halts.

The next step 101 of the method is to unlock robotic shuttle assembly in preparation for further motion. This is accomplished by deactivating robotic shuttle drive brake 75f.

The next step 102 of the method is to move robotic shuttle assembly 8 to the slot 62 in removable magazine assembly 6 that contains the cartridge to be extracted. This entails activating DC motor 72a and engaging drive clutch 74c of main drive assembly 7. Position sensor 85 reads the notches of guide rail 16 and permits the control logic to determine when the front port of robotic shuttle assembly 8 is positioned directly opposite the desired slot 62 of removable magazine assembly 6, at which point DC motor 72a is turned off.

The next step 103 of the method is to lock robotic shuttle assembly 8 in place. This, is accomplished by disengaging drive clutch 74c of main drive assembly 7 and activating robotic shuttle drive brake 75f.

The next step 104 of the method is to verify that robotic shuttle assembly 8 is at a slot 62 of removable magazine assembly 6. The next step 105 of the method is to open the desired slot 62 of removable magazine assembly 6 by depressing the rear latching lever 63 at the bottom rear of the slot. This is accomplished by activating solenoid 821 and hence magazine release lever assembly 820.

The next step 106 of the method is to rotate rocker arm assembly 87 clockwise. This is accomplished by activating DC motor 88a for rotation in a clockwise direction.

The next step 107 of the method is to verify that robotic shuttle assembly 8 is at a magazine slot 62 populated with a cartridge. This is accomplished by position sensor 813, which will detect the front end of rocker beam frame 87a if no cartridge is present in slot 72. If no cartridge is present, an error is returned and the storage library subsystem halts.

The next step 108 of the method is to activate the drive rollers of rocker beam assembly 87 to move the cartridge into robotic shuttle assembly 8 through the front port of robotic shuttle assembly 8. This is accomplished by activating DC motor 72a so that its drive shaft rotates in a counterclockwise direction.

The next step 109 of the method is to monitor the progress of the cartridge extraction operation with position sensor 814. If the cartridge is not fully seated in robotic shuttle assembly 8, the method proceeds to step 109a, stopping of the rocker drive, and then to step 109b, determination of whether to retry step 108. If step 109 determines that the cartridge is fully seated in robotic shuttle assembly 8, the next step 110 of the method is to stop the drive rollers of rocker beam assembly 87 by deactivating DC motor 72a.

The next step 111 of the method is to determine whether the robotic shuttle assembly 8 is at a slot 62 of removable magazine assembly 6. The next step 112 of the method is to close the rear of slot 62 by deactivating magazine release lever drive solenoid 821. The next and last step 113 of the method is to release rocker beam assembly 87 for return to a neutral position by deactivating DC motor 88a.

This method also may be utilized to extract a cartridge from either fixed magazine 14 or a media read/write device 2. In either case, steps 105 and 112 are omitted.

Figure 10:
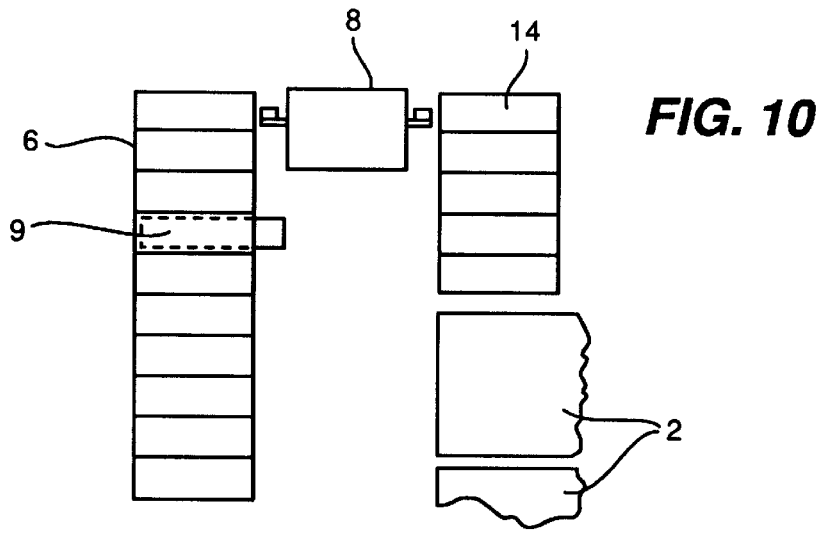
FIG. 10 shows a top schematic view of major components of the storage library subsystem shown in FIG. 1, with the robotic shuttle at the far right of the removable magazine.

FIG. 10 is a top schematic view of major components of the storage library subsystem shown in FIG. 1. Robotic shuttle assembly 8 is positioned at the far right of both removable magazine 6 and fixed magazine 14. A cartridge 9 is present in the fourth slot of removable magazine 6. Media read/write devices 2 are shown partly cut away. FIG. 10 depicts the state of the storage subsystem before the method of FIG. 9 has been commenced.

Figure 11:
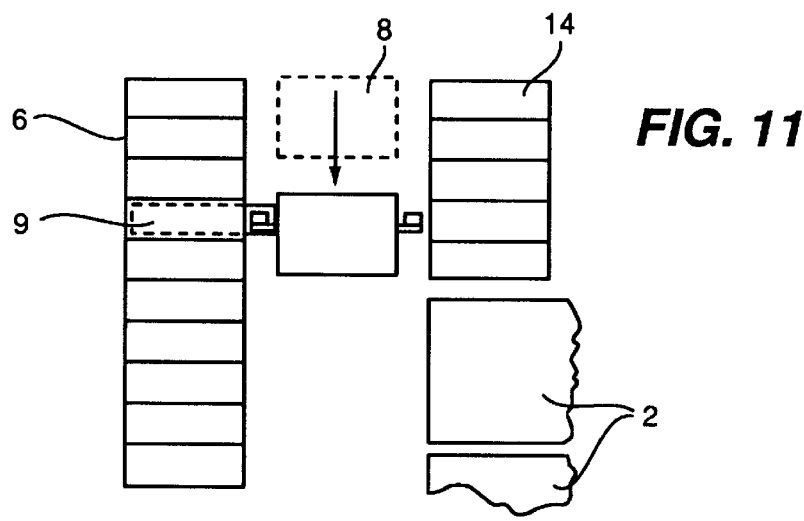
FIG. 11 shows the same schematic view as FIG. 10, except that the robotic shuttle has been moved in preparation for retrieving a cartridge from the removable magazine.

FIG. 11 is the same schematic view as FIG. 10, except that the method of FIG. 9 has been commenced. Robotic shuttle assembly 8 has been moved to a position directly opposite cartridge 9 in preparation for removing the cartridge from removable magazine 6. FIG. 11 depicts the state of the storage subsystem after step 103 of the method of FIG. 9 has been completed.

Figure 12:
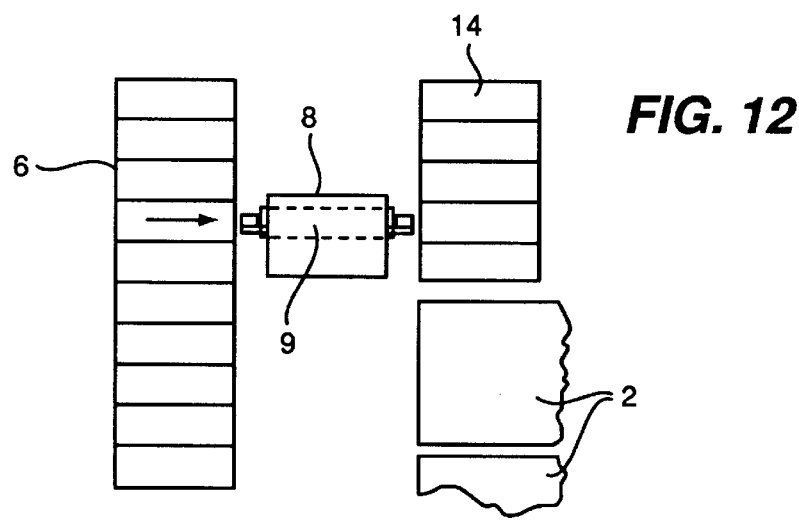
FIG. 12 shows the same schematic view as FIG. 11, except that the robotic shuttle has retrieved the cartridge from the removable magazine.

FIG. 12 is the same schematic view as FIG. 11, except that the method of FIG. 9 has been completed. Cartridge 9 has been removed from removable magazine 6 and secured in robotic shuttle assembly 8.

Figure 13:
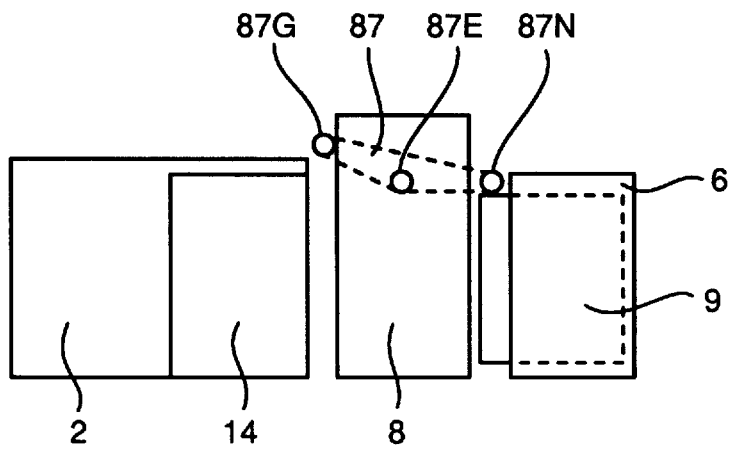
FIG. 13 shows a left-side schematic view of major components of the storage library subsystem shown in FIG. 1, with the robotic shuttle in position to begin retrieving a cartridge.

FIG. 13 is a left-side schematic view of major components of the storage library subsystem shown in FIG. 1. Robotic shuttle assembly 8 is in position to begin retrieving a cartridge 9 from removable magazine 6. Robotic shuttle rocker arm 87 has been rotated clockwise so that front drive roller 87*n* is in contact with the top of cartridge 9. Fixed magazine 14 and media read/write device 2 are disposed to the rear of robotic shuttle assembly 8. FIG. 13 depicts the state of the storage subsystem after step 107 of the method of FIG. 9 has been completed.

Figure 14:
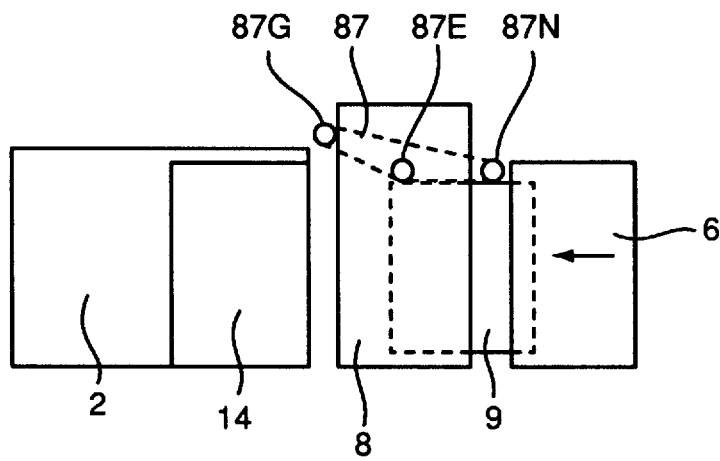
FIG. 14 shows the same schematic view as FIG. 13, except that cartridge retrieval has been initiated and is partly completed.

FIG. 14 is the same schematic view as FIG. 13, except that cartridge 9 has been partially received into robotic shuttle assembly 8. The top of cartridge 9 is in contact with both front drive roller 87*n* and central drive roller 87*e*. FIG. 14 depicts the state of the storage subsystem as step 109 of the method of FIG. 9 is being performed.

Figure 15:
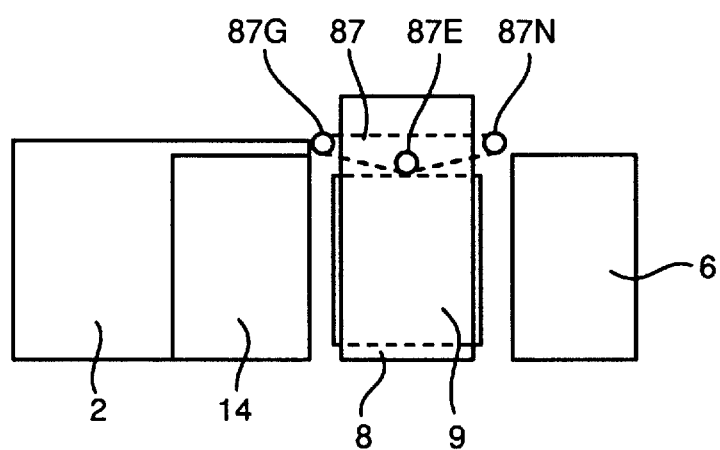
FIG. 15 shows the same schematic view as FIG. 14, except that cartridge retrieval has been completed.

FIG. 15 is the same schematic view as FIG. 14, except that the method of FIG. 9 has been completed. Cartridge 9 has been removed from removable magazine 6 and secured in robotic shuttle assembly 8. Central drive roller 87*e* is in contact with the top of cartridge 9.

Figure 16:
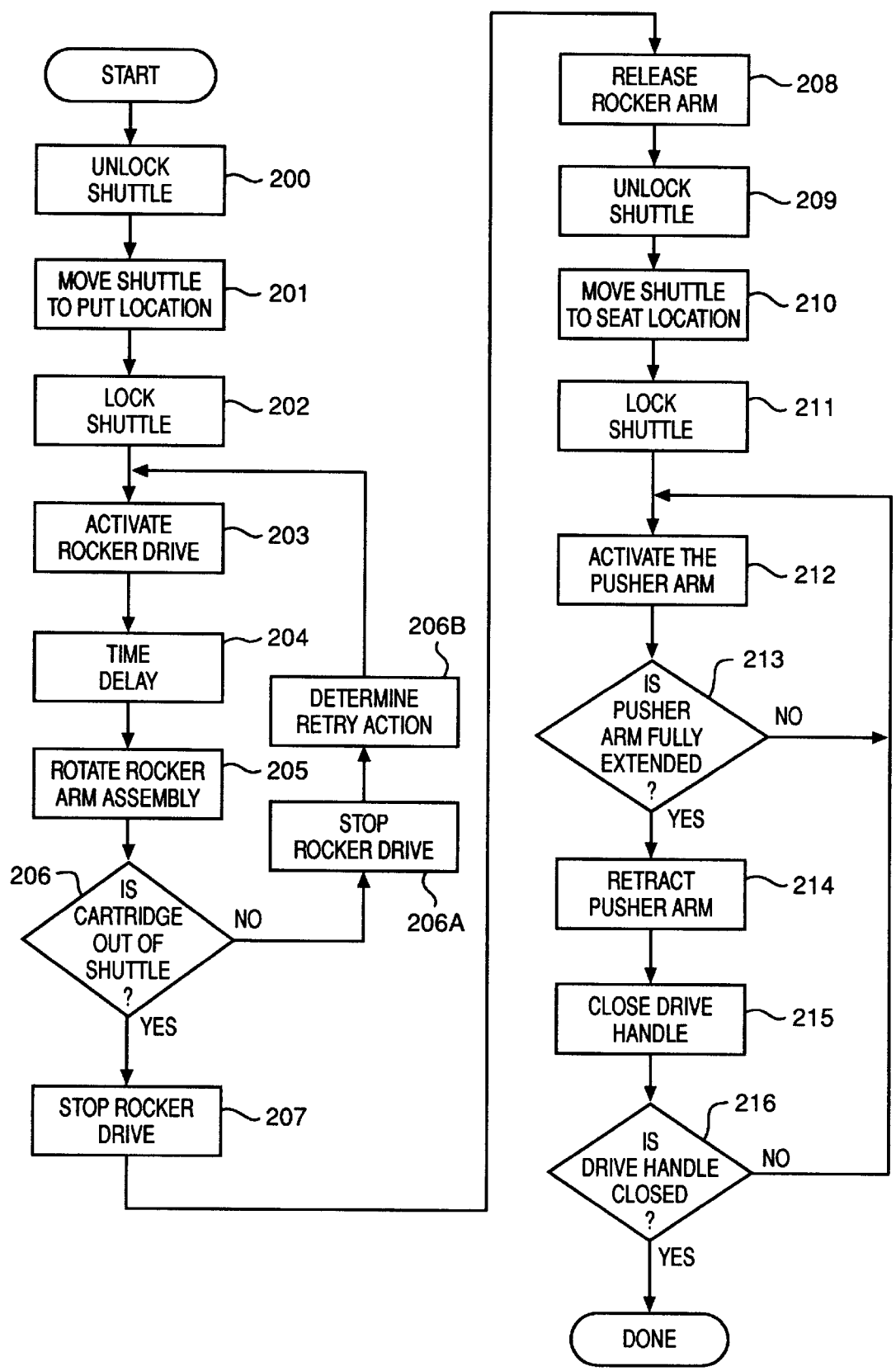
FIG. 16 shows a flowchart of a method of inserting a storage media cartridge into a media read/write device of the storage library subsystem shown in FIG. 1.

FIG. 16 is a flowchart of a preferred method of inserting a cartridge 9 secured in robotic shuttle assembly 8 into a media read/write device 2. The first step 200 of the method is to unlock robotic shuttle assembly 8 in preparation for further motion. This is accomplished by deactivating robotic shuttle drive brake 75*f*.

The next step 201 of the method is to move robotic shuttle assembly 8 to the cartridge receptacle of media read/write device 2. This entails activating DC motor 72*a* and engaging drive clutch 74*c* of main drive assembly 7. Position sensor 85 reads the notches of guide rail 16 and permits the control logic to determine when the front port of robotic shuttle assembly 8 is positioned directly opposite the receptacle of media read/write device 2, at which point DC motor 72*a* is turned off.

The next step 202 of the method is to lock robotic shuttle assembly 8 in place. This is accomplished by disengaging drive clutch 74*c* of main drive assembly 7 and activating robotic shuttle drive brake 75*f*.

The next step 203 of the method is to activate the drive rollers of rocker beam assembly 87 to move the cartridge in robotic shuttle assembly 8 through the rear port of robotic shuttle assembly 8. This is accomplished by activating DC motor 72*a* so that its drive shaft rotates in a counter-clockwise direction.

The next step 204 of the method is to introduce a time delay. The next step 205 of the method is to rotate rocker beam assembly 87 counterclockwise. This is accomplished by activating DC motor 88*a* so that its drive shaft turns in a counter-clockwise direction.

The next step 206 of the method is to monitor the progress of the cartridge ejection operation with position sensor 814. If the cartridge is not fully ejected from robotic shuttle assembly 8, the method proceeds to step 206*a*, stopping of the rocker drive, and then to step 109*b*, determination of whether to retry step 203. If step 206 determines that the cartridge is fully ejected from robotic shuttle assembly 8, the next step 207 of the method is to stop the drive rollers of rocker beam assembly 87 by deactivating DC motor 72*a*.

The next step 208 of the method is to release rocker beam assembly 87 for return to a neutral position by deactivating DC motor 88*a*. The next step 209 of the method is to unlock robotic shuttle assembly 8 in preparation for further motion. This is accomplished by deactivating robotic shuttle drive brake 75*f*.

The next step 210 of the method is to move robotic shuttle assembly 8 so that pusher arm 816*a* is positioned directly opposite the front face of the cartridge. This entails activating DC motor 72*a* and engaging drive clutch 74*c* of main drive assembly 7. Position sensor 85 reads the notches of guide rail 16 and permits the control logic to determine when pusher arm 816*a* is positioned directly opposite the cartridge, at which point DC motor 72*a* is turned off.

The next step 211 of the method is to lock robotic shuttle assembly 8 in place. This is accomplished by disengaging drive clutch 74*c* of main drive assembly 7 and activating robotic shuttle drive brake 75*f*.

The next step 212 of the method is to initiate rearward motion of pusher arm 816*a* by activating drive clutch 819*e*. The next step 213 of the method is to monitor the progress of the pushing operation with position sensor 818 until pusher arm 816*a* is fully extended. The next step 214 is to stop the pushing operation by deactivating drive clutch 819*e* and to initiate retraction of pusher arm 816*a* by reversing the direction of rotation of DC drive motor 72*a* and activating drive clutch 819*e*.

The next step 215 of the method is to close the handle of media read/write device 2. The next step 216 of the method is to verify that the handle of media read/write device 2 is closed. If so, the method of FIG. 16 is complete. If not, the method loops back to step 212.

This method also may be utilized to insert a cartridge into a slot of either removable magazine assembly 6 or fixed magazine 14. In either case, steps 210 through 216 are omitted. When the method is used to insert a cartridge into a slot 62 of removable magazine assembly 6, a step of depressing the rear latching lever 63 associated with that slot is inserted after step 202 and before step 203, and a step of releasing the rear latching lever 63 is inserted after step 208 and before step 209.

Figure 17:
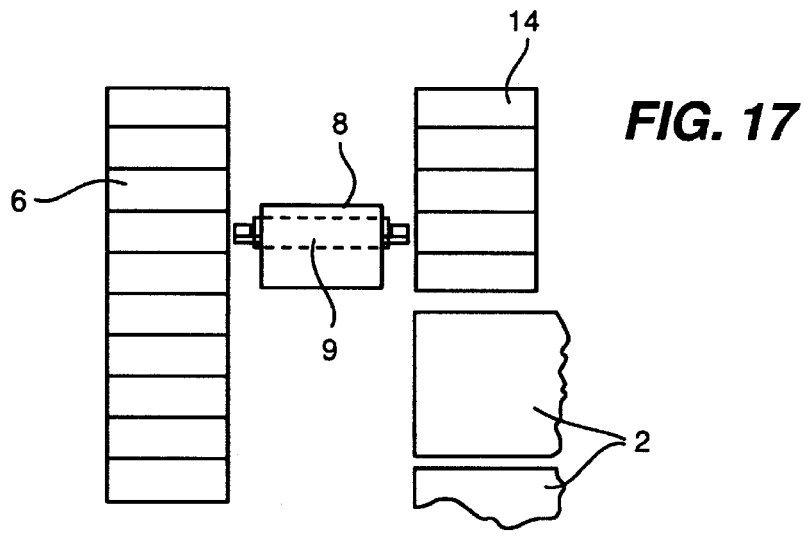
FIG. 17 shows a top schematic view of major components of the storage library subsystem shown in FIG. 1, with the robotic shuttle holding a cartridge and positioned opposite the approximate middle of the removable magazine.

FIG. 17 is a top schematic view of major components of the storage library subsystem shown in FIG. 1. Robotic shuttle assembly 8 is positioned approximately midway between the lateral ends of both removable magazine 6 and fixed magazine 14. A cartridge 9 is secured in robotic shuttle assembly 8. Media read/write devices 2 are shown partly cut away. FIG. 10 depicts the state of the storage subsystem before the method of FIG. 16 has been commenced.

Figure 18:
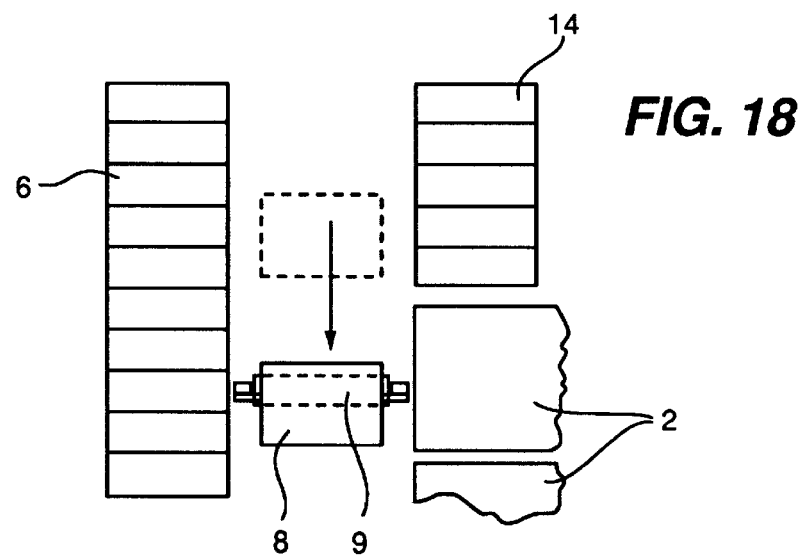
FIG. 18 shows the same schematic view as FIG. 17, except that the robotic shuttle has been moved in preparation for inserting the cartridge into a media read/write device.

FIG. 18 is the same schematic view as FIG. 17, except that the method of FIG. 16 has been commenced. Robotic shuttle assembly 8 has been moved to a position directly opposite first media read/write device 2 in preparation for inserting cartridge 9 into first media read/write device 2. FIG. 11 depicts the state of the storage subsystem after step 202 of the method of FIG. 16 has been completed.

Figure 19:
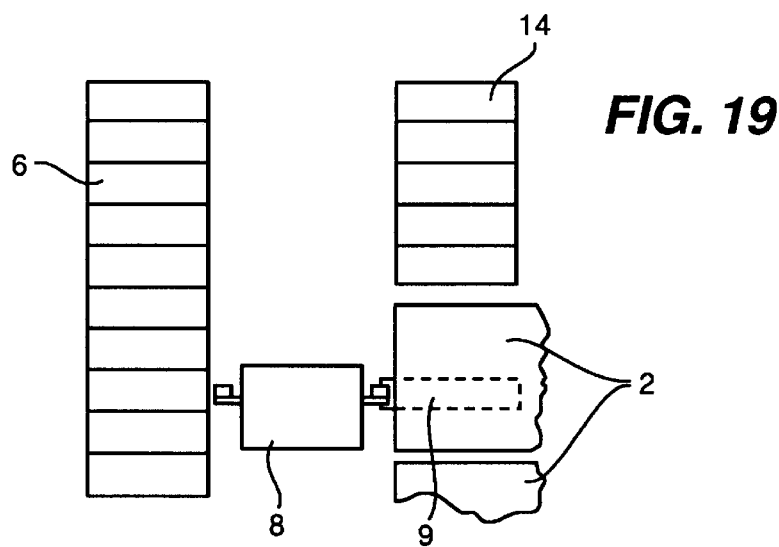
FIG. 19 shows the same schematic view as FIG. 18, except that the robotic shuttle has inserted the cartridge into the media read/write device.

FIG. 19 is the same schematic view as FIG. 18, except that the method of FIG. 16 has been completed. Cartridge 9 has been removed from robotic shuttle assembly 8 and secured into first media read/write device 2.

Figure 20:
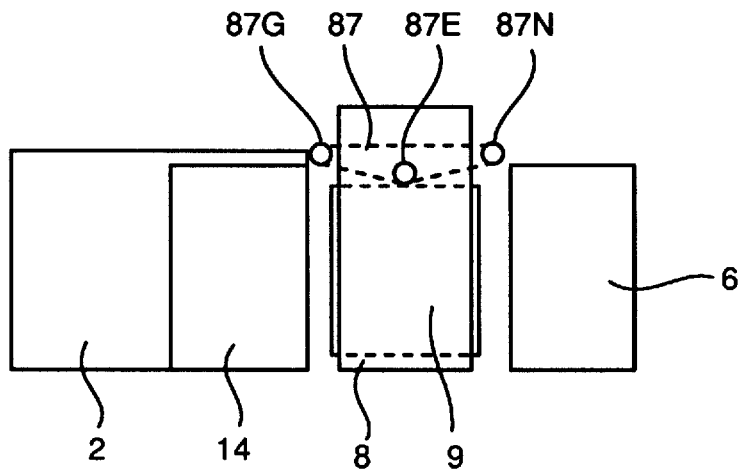
FIG. 20 shows a left-side schematic view of major components of the storage library subsystem shown in FIG. 1, with the robotic shuttle in position to begin inserting a cartridge into a media read/write device.

FIG. 20 is a left-side schematic view of major components of the storage library subsystem shown in FIG. 1. Robotic shuttle assembly 8 is in position to begin inserting a cartridge 9 into first media read/write device 2. Central drive roller 87e is in contact with the top of cartridge 9. Fixed magazine 14 and first media read/write device 2 are disposed to the rear of robotic shuttle assembly 8. FIG. 20 depicts the state of the storage subsystem after step 205 of the method of FIG. 16 has been completed.

Figure 21:
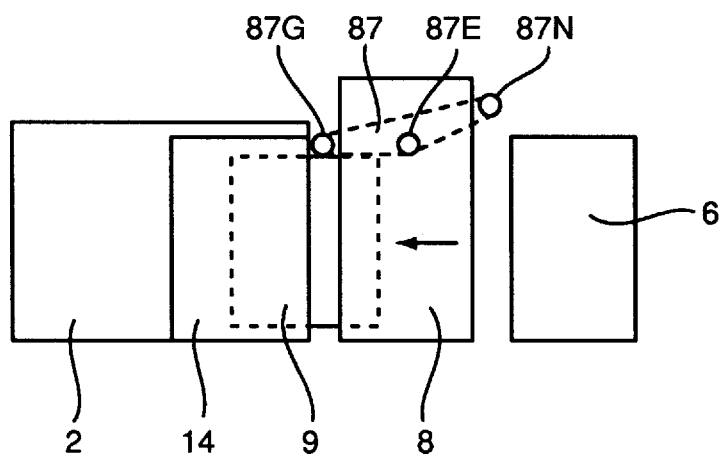
FIG. 21 shows the same schematic view as FIG. 20, except that cartridge insertion has been initiated and is partly completed.

FIG. 21 is the same schematic view as FIG. 13, except that cartridge 9 has been partially inserted into first media read/write device 2. Robotic shuttle rocker arm 87 has been rotated counter-clockwise so that first rear drive roller 87g contacts cartridge 9 as it moves out of robotic shuttle assembly 8. FIG. 14 depicts the state of the storage subsystem as step 206 of the method of FIG. 16 is being performed.

Figure 22:
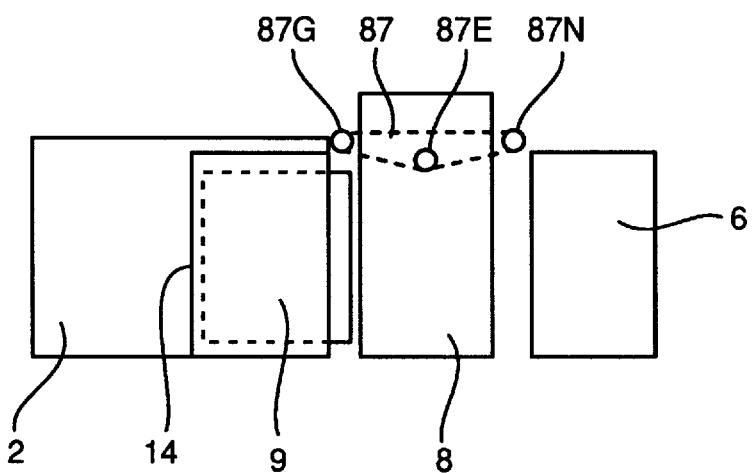
FIG. 22 shows the same schematic view as FIG. 21, except that cartridge insertion has been completed.

FIG. 22 is the same schematic view as FIG. 21, except that the method of FIG. 16 has been completed. Cartridge 9 has been removed from robotic shuttle assembly 8 and fully inserted into first media read/write device 2.

Although exemplary embodiments of the invention have been described in detail above, those skilled in the art will readily appreciate that the embodiments may be modified extensively without materially departing from the novel teachings and advantages of the invention. All such modifications fall within the scope of this invention as defined in the following claims.

What is claimed is:

1. A storage library subsystem comprising:
   a frame;
   a robotic shuttle attached to and linearly movable relative to said frame, said robotic shuttle having a shuttle frame with a first port and a second port for receipt and ejection of storage media cartridges and a sole beam pivotably attached to said shuttle frame wherein said rocker beam is a single member that pivots substantially about its center, and wherein said rocker beam has a first end protruding out said first port and a second end protruding out said second port, and wherein rotation of said rocker beam to a clockwise and counterclockwise position is operable for moving said storage media cartridge into and out of said first and second ports;
   a first media read/write device attached to said frame, said media read/write device being disposed opposite said first port of said robotic shuttle at a first point of the linear movement of said robotic shuttle so that a storage media cartridge may be passed between said device and said robotic shuttle at said first point of linear movement; and
   a first storage media cartridge magazine attached to said frame, said first magazine having at least one slot for storage of a storage media cartridge, said slot being disposed opposite said second port of said robotic shuttle at a second point of the linear movement of said robotic shuttle so that a storage media cartridge may be passed between said slot and said robotic shuttle at said second point of linear movement.

2. The storage library subsystem of claim 1 wherein said first and second points of linear movement are the same.

3. The storage library subsystem of claim 1 wherein said magazine comprises a plurality of slots, said slots being arranged in a linear array parallel to the axis of motion of said robotic shuttle so as to be accessible to the second port of said robotic shuttle within its range of linear motion.

4. The storage library subsystem of claim 3 wherein said magazine is removable from said subsystem.

5. The storage library subsystem of claim 3 further comprising a second media read/write device attached to said frame and accessible to said robotic shuttle, said first and second media read/write devices being arranged in a linear array parallel to the axis of motion of said robotic shuttle.

6. The storage library subsystem of claim 5 further comprising a second storage media cartridge magazine attached to said frame, said second magazine having at least one slot for storage of a storage media cartridge, said slot being disposed opposite the first port of said robotic shuttle at a third point of the linear movement of said robotic shuttle so that a storage media cartridge may be passed between said slot and said robotic shuttle at said third point of linear movement.

7. The storage library subsystem of claim 6 wherein said second magazine comprises a plurality of slots, said slots being arranged in a linear array parallel to the axis of motion of said robotic shuttle so as to be accessible to the first port of said robotic shuttle within its range of linear motion.

8. The storage library subsystem of claim 3 wherein said magazine is not removable from said subsystem.

9. A storage library subsystem comprising:
   a frame;
   a media read/write device attached to said frame;
   a storage media cartridge magazine attached to said frame, said magazine having at least one slot for storage of a storage media cartridge;
   a robotic shuttle for moving said storage media cartridge between said media read/write device and said slot from said storage media cartridge magazine, said robotic shuttle having a shuttle frame with a front and a rear port for receipt and ejection of storage media cartridges and a sole rocker beam pivotably attached to said shuttle frame wherein said rocker beam is a single member that pivots substantially about its center, and wherein said rocker beam has a first end protruding out said front port and a second end protruding out said rear port, and wherein rotation of said rocker beam to a clockwise and counterclockwise direction position is operable for moving said storage media cartridge into and out of said front and rear ports; and
   a drive belt to move said robotic shuttle means transversely in said frame.

10. A method for moving a storage media cartridge from a first location to a second location in a storage library subsystem, wherein said storage library subsystem includes a robotic shuttle, said robotic shuttle comprising:
   a shuttle frame with a first port and an opposing second port; and
   a sole rocker beam rotatably attached to said shuttle frame wherein said rocker beam is a single member that pivots substantially about its center and said rocker beam has a first end protruding out said first port and a second end protruding out said second port;
   said method comprising the steps of:
      moving said robotic shuttle linearly so that said first port of said shuttle is aligned with said first location;
      rotating said rocker beam in a first direction;
      conveying the cartridge from said first location into said robotic shuttle;

rotating said rocker beam to a neutral position;
moving said shuttle linearly so that said second port of said shuttle is aligned with said second location;
rotating said rocker beam in a second direction; and
conveying the cartridge from said robotic shuttle into said second location.

11. The method of claim 10 further comprising the steps of:
locking said robotic shuttle in place while conveying the cartridge from said first location into said robotic shuttle; and
locking said robotic shuttle in place while conveying the cartridge from said shuttle into said second location.

12. The method of claim 10 further comprising the step of verifying that said robotic shuttle is empty before moving said robotic shuttle linearly so that a first port of said shuttle is aligned with said first location.

13. The method of claim 10 further comprising the step of ascertaining that a cartridge is present in said first location before moving the cartridge from said first location into said robotic shuttle.

14. The method of claim 10 further comprising the step of ascertaining that said second location is empty before moving the cartridge from said robotic shuttle into said second location.

15. The method of claim 10 wherein said first location is selected from the group consisting of a slot of a storage media cartridge magazine and a media read/write device.

16. The method of claim 15 wherein said second location is selected from the group consisting of a slot of a storage media cartridge magazine and a media read/write device.

17. A storage library subsystem comprising:
a frame;
a media read/write device attached to said frame;
at least one removable storage media cartridge magazine attached to said frame, said storage media cartridge magazine having at least one slot for storage of a storage media cartridge;
at least one non-removable storage media cartridge magazine attached to said frame, said non-removable storage media cartridge magazine having at least one slot for storage of a storage media cartridge;
robotic shuttle means for moving said storage media cartridge between said media read/write device and said slot from said removable storage media cartridge magazine and non-removable storage media cartridge magazine, said robotic shuttle means comprising:
a shuttle frame with a front and rear port for receipt and ejection of storage media cartridges; and
a sole rocker beam pivotably attached to said shuttle frame wherein said rocker beam is a single member that pivots substantially about its center, and wherein said rocker beam has a first end protruding out said front port and a second end protruding out said rear port, and wherein rotation of said rocker beam in a clockwise and counterclockwise direction is operable for positioning said rocker beam to move said storage media cartridge into and out of said front and rear ports; and
a drive belt to move said robotic shuttle means transversely in said frame.

18. The storage library subsystem of claim 17, wherein said slots in said removable and non-removable storage media cartridge magazine are arranged in a linear array parallel to the axis of motion of said robotic shuttle means as to be accessible to said robotic shuttle means.

* * * * *